3,554,778
METHOD FOR DEVELOPING LATENT ELECTROSCOPIC IMAGES
Daniel B. Granzow, Jr., Arlington Heights, Ill., assignor to Addressograph-Multigraph Corporation, Cleveland, Ohio, a corporation of Delaware
No Drawing. Filed Apr. 19, 1966, Ser. No. 543,530
Int. Cl. G03g 13/08
U.S. Cl. 117—17.5     4 Claims

ABSTRACT OF THE DISCLOSURE

Disclosed is a method of developing latent electrostatic images which comprises passing the surface containing the image through a fluid-like granular developing composition composed of toner particles and carrier particles wherein the carrier particles are composed of silicates of calcium, magnesium, aluminum or silica. The surface area and bulk density of the carrier component is about 95–200 sq. meters/g. and 5–15 lbs./cu. ft. respectively.

---

This invention relates to developer powders for rendering latent electrostatic images visible. More particularly, this invention relates to an improved combination of nonmagnetic carrier particles with electroscopic powders which form developer mixes for electrostatic images.

It is an object of this invention to provide improved electroscopic powder mixes. It is a further object of this invention to provide improved electroscopic developing powders containing carrier particles of metal silicates or silica. It is a specific object of this invention to provide an electroscopic developing powder comprising a blend of thermoplastic resins and nonmagnetic silica or metal silicate particles which is suitable for developing latent electrostatic images on sheet materials. These and other objects are apparent from and are achieved in accordance with the following disclosure.

The electroscopic powders which comprise this invention are mixtures of colored synthetic resin particles and particles of a metal silicate or silica. The colored thermoplastic resin forms the electroscopic particles which are attracted to the electrostatic latent image. Among the thermoplastic resins which are operative are polystyrene, polyamide, vinyl and acrylic resins, and blends thereof. Other thermoplastic materials which are suitable include rosin, asphalt, and gilsonites. The preferred thermoplastic materials are rosin-modified phenolic resins such as those prepared by modifying a phenol-formaldehyde resin with the reaction product of maleic anhydride and rosin or a polyhydric alcohol such as glycerol or pentaerythritol. Such rosin-modified phenolic resins are sold under the trademark Amberol by Rohm & Haas Company. Other phenolic resins such as the diphenolic material esterified with soya fatty acids available from The Johnson Wax Company of Racine, Wisconsin and from the Khrumbar Resin Division of Lawter Chemicals Co. are also satisfactory. The electroscopic powder melts below the char point of the sheet material and should preferably have a relatively sharp melting point in the range from 100° to 140° C. with a softening point above about 50° C. Suitable electroscopic particles of such thermoplastic resins are described in the copending application of Loren E. Shelffo, Ser. No. 357,743 filed Apr. 6, 1964.

The following are other suitable resins that could be used in the electroscopic powders of this invention:

(1) Chlorinated paraffins, such as Chlorowax 70, Diamond Alkali Co., Cleveland, Ohio.

(2) Polyvinyl chloride copolymers, such as Vinylite VAGH, 91% vinyl chloride, 3% vinyl acetate, and 6% vinyl alcohol; VYCM 91% vinyl chloride and 9% vinyl acetate; VMCH 86% vinyl chloride, 13% vinyl acetate and 1% dibasic acid.

(3) Styrene-butadiene copolymers such as Pliolite S–5, The Goodyear Tire and Rubber Co., Akron, Ohio, and Piccotex 120, Pennsylvania Industrial Chemical Co., Clairton, Pa.

(4) Hydrocarbon resins such as Piccotex 120, Pennsylvania Industrial Chemical Co., Clairton, Pa.

(5) Acrylates and acrylic copolymers, such as Acryloid A–101, Rohm & Haas Co., Philadelphia, Pa.

(6) Thermoplastic hydrocarbon terpene resins, such as Piccolyte S–135, Pennsylvania Industrial Chemical Co.

As is well known in the art, the thermoplastic resin particles are colored to produce colored images. The preferred coloring agent is carbon black although other pigments and dyes can be used, such as nubian resin black, nigrosine dye and other organic dyes which are soluble in the resins and produce colors which are stable at the fusing temperatures thereof. Generally the amount of dye or pigment is that sufficient to produce suitably colored resin particles. With polystyrene an amount of pigment as much as 6% of the weight of resin can be used.

The other essential component of the developer powders is a nonmagnetic inorganic powder which acts as a carrier for the electroscopic powder. The carrier particles are finely divided particles of metal silicates or silica. The average size of the carrier particles is from 2 to 10 microns. The relative proportions of carrier particles and electroscopic resin particles can be in the range from 0.1 part to 5 parts of electroscopic powder to 1 part of carrier. The inorganic particles are of relatively low bulk density in the range from 5 to 15 pounds per cubic foot. The surface area of the particles is relatively large and is preferably in the range from 95 to 200 square meters per gram. Among the metal silicates which are preferred are calcium, magnesium and aluminum silicates and combinations thereof. Silicates of other metals such as barium, iron, zinc, beryllium, zirconium, thorium, and manganese are also operative. The silica is preferably in the form of diatomite, infusorial earth or kieselguhr. Preferred carrier materials include Micro-Cel C and Micro-Cel E which are synthetic hydrous calcium silicates manufactured by Johns-Manville Corporation, Celkate, which is a synthetic hydrous magnesium silicate manufactured by Johns-Manville Corporation, and Super Floss which is flux-calcined diatomite of average particle size of 2–4 microns (Johns-Manville Corporation).

The electroscopic developer powders of this invention are highly fluid and are suitable for the dry development of latent electrostatic images which are produced on sheet materials by elastrostatic photocopying procedures. These materials, although dry powders, are of low apparent density and can be applied to a sheet directly without need for the so-called magnetic brush applicator. These electroscopic developer powders can be applied to a latent electrostatic image by cascading the mixtures over the exposed surface bearing the image or by passing the exposed sheet bearing the image through a trough containing the developer mixture in a dip tank. By the dip tank method it is possible to develop images at a rate of 30 to 50 feet per minute.

When the developer powder comes in contact with the latent electrostatic image, the electroscopic particles of thermoplastic resin are attracted to the charged image and held thereto by electroscopic forces. The sheet material is then heated to a relatively high temperature to cause the thermoplastic resins to fuse and adhere to the sheet material, thus forming a permanent image thereon. The carrier particles of metal silicates or silica are not attracted to the latent electrostatic image and do not form a part of the visible image.

In the preparation of the electroscopic powder, the resin constituents of the toner are rendered molten, and the pigment and/or dye are added in an amount ranging from about 1% to about 17% of the weight of the amount of resin employed, preferably in the range of from 3% to 6%. The pigment and/or dye are distributed throughout the molten resin so that a homogeneously colored solution or dispersion is achieved. The material is poured into shallow pans and permitted to cool, thereafter being ground or milled to an average particle size range of from 1 to 50 microns, preferably in the range of from 5 to 25 microns.

The resin powder when in contact with the non-ferromagnetic carrier material acquires an electrostatic charge having a polarity opposite to that of the charged photoconductive insulating layer of the photoconductive member.

The invention is disclosed in further detail by means of the following examples which are provided for purposes of illustration only. It will be readily appreciated by those skilled in the art that these various modifications in electroscopic resin powders, metal silicates, relative proportions of materials and variations of particle sizes can be made without departing from the invention as herein described. In this application various quantities of materials are given in parts by weight.

EXAMPLE 1

Ten parts of electroscopic resin particles were thoroughly mixed with 100 parts of hydrous calcium silicate. The resulting mixture was cascaded over a sheet of paper bearing an electrostatic latent image. The electroscopic resin particles were attracted to the electrostatic image and formed a clear visible image. The paper was passed under an infrared lamp and the resin particles were fused to the paper, forming a permanent black image.

The hydrous calcium silicate was Micro-Cel E of Johns-Manville Corporation. It had a bulk density of 5.4 pounds per cubic foot, a surface area of 95 square meters per gram and an average particle size of 2.1 microns.

The electroscopic resin particles were produced from the following formulation:

| | Percent |
|---|---|
| Synthetic, polyamide, thermoplastic resin (Versamid 930, General Mills, Inc.) | 33 |
| Polyol (X-450, Shell Chemical Company) | 9.9 |
| Maleic anhydride-polyhydric alcohol rosin-modified resin (Amberol 800, Rohm & Haas Company) | 49.5 |
| Nubian resin black dye | 6.6 |
| Carbon black pigment (Neo-spectra, Mark II) | 1.0 |

The entire quantity of carbon black pigment, because of its insolubility in the ingredients, was thoroughly dispersed in a portion of the molten polyamide in a high shear blender device (a Baker-Perkins blender) in the ratio of one part carbon black pigment to 8–10 parts polyamide resin. This color batch was blended for 30 minutes at 250° F. in the Baker-Perkins unit.

The remaining polyamide resin was reduced to its molten state in a steam-jacketed kettle maintained at 360° F. which was equipped with a conventional impeller type mixer. To the molten polyamide resin was added the polyol while the molten mass was agitated. The mixture was stirred until uniform and the maleic anhydride-polyhydric alcohol rosin-modified resin was added at the rate of approximately 3–5 pounds per minute, addition being made gradually in order to achieve the greatest uniformity. After the maleic anhydride polyhydric alcohol resin was completely melted, the black dye was added slowly over a period of 10 minutes until it was thoroughly dissolved in the molten mass. Agitation was continued thereafter for another 5–10 minutes before the premixed color batch was added. Upon addition of the color batch to the main batch, it was strongly agitated with a Cowles dissolver for 30 minutes. The temperature was not allowed to exceed 400° F. at any time during the processing.

After the materials had been properly mixed and dispersed and the color of the batch was uniform, it was poured into shallow pans to cool and solidify. In a preliminary crushing operation in an Abbe pulverizer, the solidified material was ground to particles of approximately one-quarter inch in size; thereafter, is was passed through a fluid-energy mill (such as a Mikro-Pulverizer, Micronizer, Jet-O-Mizer, or Jet Pulverizer) which granulated the thermoplastic resin to an average particle size ranging from 4–10 microns. As a final step, the electroscopic powder was passed through a 200 mesh screen and the particles which remained on the screen were charged back to the fluid-energy mill.

EXAMPLE 2

An electroscopic developer powder was produced by thoroughly mixing 50 parts of electroscopic resin particles (as described in Example 1) with 100 parts of Micro-Cel E hydrous calcium silicate. This powder was placed in a dip tank and sheet paper bearing an electrostatic latent image thereon was passed through the dip tank at the rate of 30 feet per minute. The resin particles were attracted to the latent image and adhered to the sheet in the imaged area, forming a visible image. As the paper emerged from the dip tank it was passed under an infrared lamp which heated the resin particles above their melting point, thus fusing them to the paper.

EXAMPLE 3

Electroscopic developer powders were produced by mixing the pigmented thermoplastic resin of Example 1 with various carrier particles in the formulations set forth below. These developer powders were suitable for developing electrostatic latent images by the cascade method and by the dip tank procedure.

| Carrier | Average particle size (microns) | Carrier bulk density (lbs./cu. ft.) | Ratio of carrier to resin | Print quality | Background |
|---|---|---|---|---|---|
| Calcium silicate | 3.4 | 7.5 | 2.5:1 | Excellent | Slight. |
| Calcium silicate | 2.1 | 5.4 | 1:1 | do | None. |
| Magnesium silicate | 2.6 | 13.5 | 1:1 | do | Do. |
| Diatomite | 4.3 | 9.7 | 0.5:1 | Fair | Some. |
| Fuller's earth | 5.8 | 10.9 | 0.5:1 | do | Slight. |
| Talc | 8.1 | 12.6 | 2.5:1 | do | Do. |
| Silica | 9.8 | 14.9 | 2.5:1 | Good | Some. |

EXAMPLE 4

Resin: 0.5 part by weight
Polystyrene (Piccolastic D-100, Pennsylvania Industrial Chemical Co.): 56.9%
Polystyrene (Piccolastic C-125, Pennsylvania Industrial Chemical Co.): 36.9%
Nigrosine black: 5.0%
Carbon black: 1.2%
Carrier: 1 part by weight, fuller's earth, technical grade (Sargent)

EXAMPLE 5

Resin: 1 part by weight
Polystyrene (Piccolastic D–100): 57.0%
Polystyrene (Piccolastic C–125): 38.0%
Carbon black: 3.0%
Green pigment (Heliogen Green), General Aniline & Film Corp.): 2.0%
Carrier: Talcum powder, 1 part by weight

EXAMPLE 6

Resin: 2 parts by weight
Polyamide resin (Versamide 930, General Mills Co.): 80%
Maleic anhydride-polyhydric alcohol rosin-modified resin (Amberol 800, Rohm & Haas Co.): 7%
Nigrosine dye: 6%
Polyols (Shell Chemical Co.): 8%
Carbon black pigment (Neo-spectra, Mark II): 1%
Carrier: 1 part by weight, hydrous calcium silicate (Micro-Cel C, Johns-Manville Co.).

The materials of Examples 4, 5 and 6 were processed by the procedure of Example 1 and the resulting powder mixture was suitable for developing latent electrostatic images on paper by the dip-tank method.

I claim:

1. A method of developing a visible image on a sheet material bearing an electrostatic latent image on a surface thereof which comprises the steps of passing said sheet material through a highly fluid-like granular mass of developer mix comprising from 0.10–10.0 parts by weight of thermoplastic electroscopic resin particles and one part by weight of a silicate carrier selected from the group consisting of calcium silicate, magnesium silicate, aluminum silicate, and silica, said carrier particles having a surface area in the range of 95–200 square meters per gram and a bulk density in the range of 5–15 pounds per cubic foot.

2. The method as claimed in claim 1 wherein the resin is a thermoplastic resin having a melting point in the range of from 100° C. to 140° C. and the softening point above 50° C.

3. The method as claimed in claim 2 wherein the resin particles have an average size in the range of from 5–25 microns.

4. Method of claim 1 wherein the sheet material is passed through the powder at a speed of 30 to 50 feet per minute.

References Cited

UNITED STATES PATENTS

| | | | |
|---|---|---|---|
| 2,618,552 | 11/1952 | Wise | 252—62.1 |
| 2,940,934 | 6/1960 | Carlson | 252—62.1 |
| 3,236,776 | 2/1966 | Tomanek | 252—62.1 |
| 3,079,342 | 2/1963 | Insalaco | 252—62.1 |

FOREIGN PATENTS

| | | | |
|---|---|---|---|
| 1,188,440 | 3/1965 | Germany | 252—62.1 |

OTHER REFERENCES

Orr, Jr., et al., Fine Particle Measurement, pp. 1–5, MacMillian (1959).

JOHN D. WELSH, Primary Examiner

U.S. Cl. X.R.

252—62.1; 96—1